United States Patent
Morita

(10) Patent No.: US 11,086,579 B2
(45) Date of Patent: Aug. 10, 2021

(54) SERVER SYSTEM HAVING PRINT NOTIFICATION AND CONTROL METHOD THEREOF

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/863,795

(22) Filed: Apr. 30, 2020

(65) Prior Publication Data
US 2020/0356329 A1    Nov. 12, 2020

(30) Foreign Application Priority Data

May 8, 2019 (JP) .............................. JP2019-088593
Jan. 30, 2020 (JP) .............................. JP2020-014208

(51) Int. Cl.
  *G06F 3/12* (2006.01)
(52) U.S. Cl.
  CPC .......... *G06F 3/1268* (2013.01); *G06F 3/1211* (2013.01); *G06F 3/1287* (2013.01)
(58) Field of Classification Search
  None
  See application file for complete search history.

(56) References Cited

U.S. PATENT DOCUMENTS

| | | | |
|---|---|---|---|
| 2011/0261402 A1 | 10/2011 | Yamamoto | |
| 2012/0188599 A1* | 7/2012 | Kyono | G06K 15/1818 358/1.15 |
| 2013/0003118 A1* | 1/2013 | Ito | G06F 3/1262 358/1.15 |
| 2013/0135668 A1* | 5/2013 | Minagawa | G06F 3/1205 358/1.15 |
| 2015/0278669 A1* | 10/2015 | Akiyama | H04N 1/00244 358/1.14 |
| 2016/0179447 A1 | 6/2016 | Ochi | |
| 2016/0255208 A1* | 9/2016 | Oguma | H04N 1/0023 358/1.15 |
| 2016/0274822 A1* | 9/2016 | Iwasaki | G06F 3/1287 |
| 2017/0048405 A1* | 2/2017 | Park | H04N 1/32609 |
| 2017/0249111 A1* | 8/2017 | Morimoto | G06F 3/126 |

* cited by examiner

*Primary Examiner* — Henok Shiferaw
(74) *Attorney, Agent, or Firm* — Canon U.S.A., Inc. IP Division

(57) ABSTRACT

A server system includes a reception unit configured to receive a print job from an information processing apparatus, a holding unit configured to hold the received print job in association with user identification information indicating a user who is logged in to the information processing apparatus, and a transmission unit configured to transmit the held print job to an image forming apparatus. In a case where the reception unit receives a notification indicating a failure to execute the transmitted print job, the transmission unit notifies the information processing apparatus, to which the user identified by the user identification information is logged in, of the failure to execute the transmitted print job.

15 Claims, 12 Drawing Sheets

FIG.4

| USER NAME | PASSWORD | GROUP INFORMATION | TERMINAL INFORMATION (MAC ADDRESS) | ACCESS DESTINATION (IP ADDRESS) |
|---|---|---|---|---|
| user01 | ***** | Group001 | 12:34:56:78:9a | 123.111.222.001 |
| user01 | ***** | Group001 | 11:22:33:44:55 | 123.111.222.002 |
| user02 | ***** | Group001 | 24:68:10:12:14 | 123.111.222.003 |
| ... | ... | ... | ... | ... |

FIG.8

| PRIORITY |
| --- |
| NUMBER OF COPIES TO BE PRINTED |
| PRINT SETTINGS |
| PRINT CONTENTS |
| ATTRIBUTE PARAMETER |
| ⋮ |

FIG.9

| | |
|---|---|
| OPERATION ATTRIBUTE | STATE CODE |
| | LANGUAGE CODE |
| JOB OBJECT ATTRIBUTE | ID |
| | STATE |
| | STATE MESSAGE |
| EXTENDED ATTRIBUTE (MANAGEMENT INFORMATION) | GROUP INFORMATION |
| | TERMINAL INFORMATION |
| | ACCESS DESTINATION |
| EXTENDED ATTRIBUTE (NOTIFICATION INFORMATION) | INFORMATION TYPE |
| | NOTIFICATION MESSAGE |
| | NOTIFICATION DESTINATION |
| | NOTIFICATION RANGE |

FIG.11

| DEVICE NAME | HWID | CONNECTION PORT (IP ADDRESS) |
|---|---|---|
| Virtual Printer | VP_XXXX1212 | 10.20.30.45 |
| iR-ADV 1111 | iR-ADV_AAAA0110 | 100.200.30.001 |
| iR-ADV 2222 | iR-ADV_BBBB1A2B | 100.200.30.002 |
| Test Printer | TP_ZZZZOP9R | 123.111.222.100 |
| ⋮ | ⋮ | ⋮ |

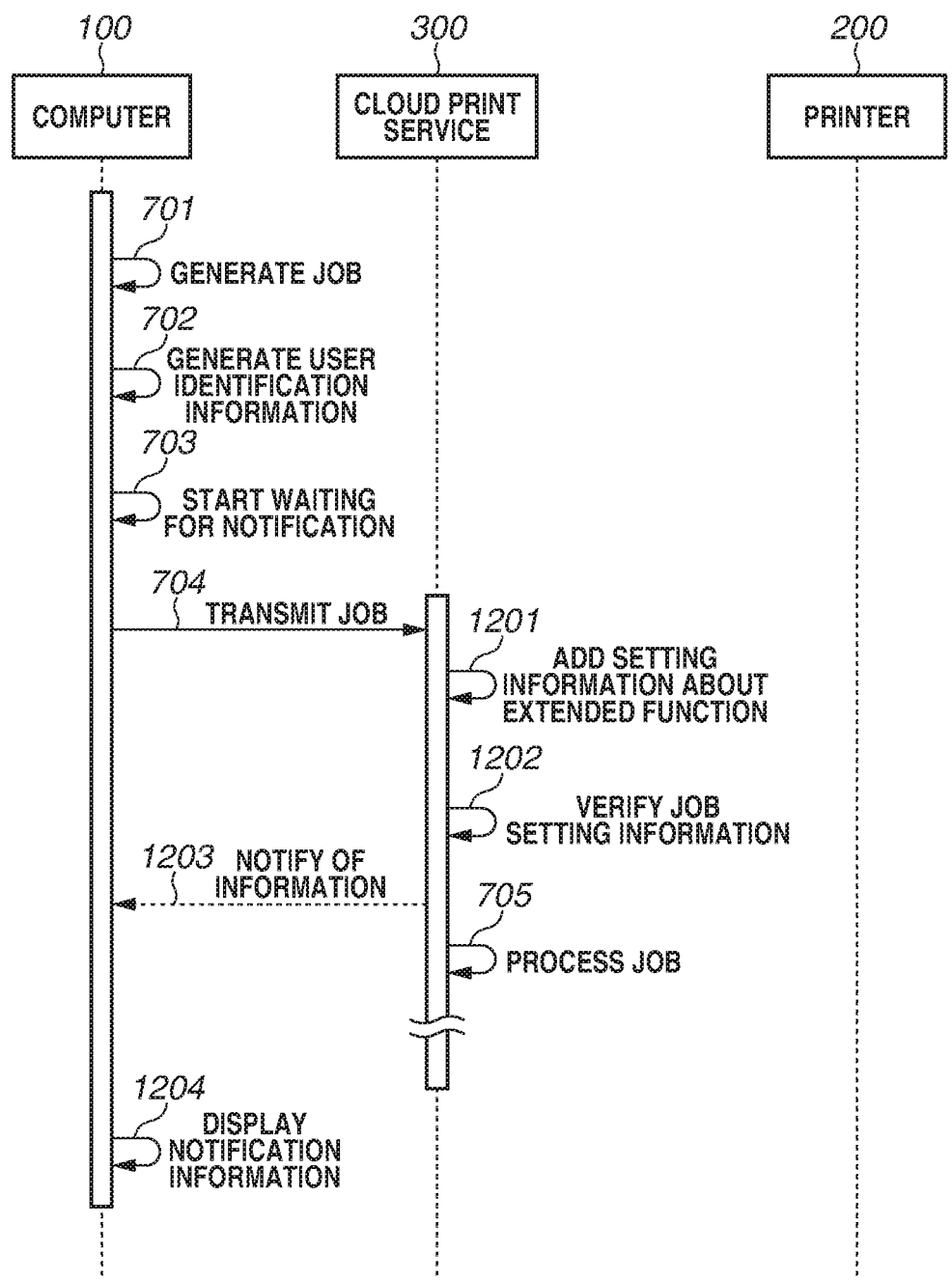

SERVER SYSTEM HAVING PRINT NOTIFICATION AND CONTROL METHOD THEREOF

BACKGROUND

Field of the Disclosure

The present disclosure relates to an information notification method in printing via a server system.

Description of the Related Art

Cloud print such as Google Cloud Print is known.

Such cloud print has some drawbacks. One example of the drawbacks is that if a print error occurs in an image forming apparatus, a user is not notified of the print error.

SUMMARY

According to an aspect of the present disclosure, a server system includes a reception unit configured to receive a print job from an information processing apparatus, a holding unit configured to hold the received print job in association with user identification information indicating a user who is logged in to the information processing apparatus, and a transmission unit configured to transmit the held print job to an image forming apparatus. In a case where the reception unit receives a notification indicating a failure to execute the transmitted print job, the transmission unit notifies the information processing apparatus, to which the user identified by the user identification information is logged in, of the failure to execute the transmitted print job.

Further features of the present disclosure will become apparent from the following description of exemplary embodiments with reference to the attached drawings.

BRIEF DESCRIPTION OF THE DRAWINGS

FIG. 4 is a table illustrating management information about user notification destinations.

FIG. 8 illustrates one example of data of a print job.

FIG. 9 illustrates one example of attribute parameters of the print job.

FIG. 11 illustrates one example of internal information about the printer.

FIG. 12 is a sequence diagram in which an event generated in a cloud print service is notified.

DESCRIPTION OF THE EMBODIMENTS

Exemplary embodiments of the present disclosure will be described below with reference to the drawings.

Figure 1:
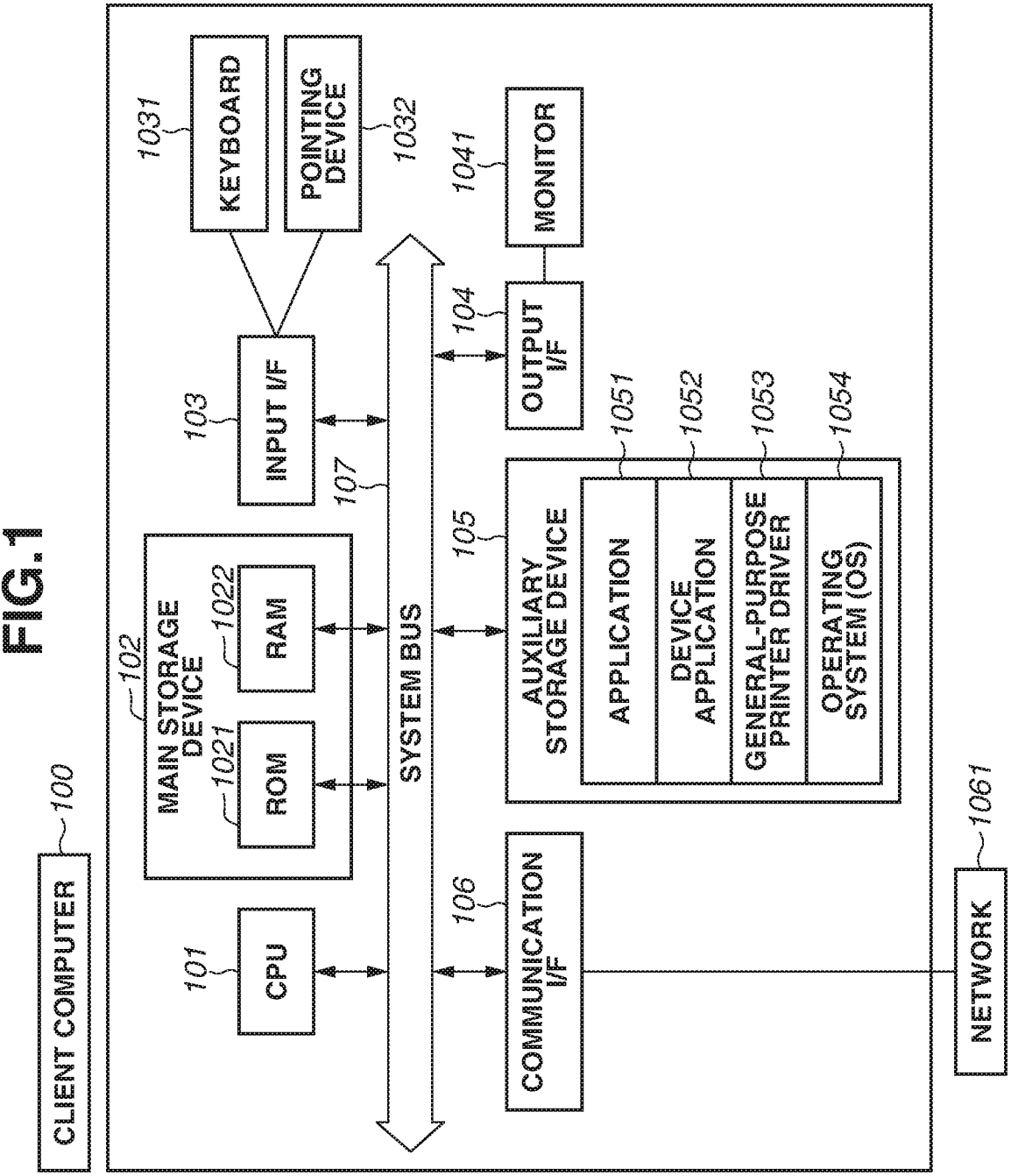
FIG. 1 is a block configuration diagram illustrating hardware and software of a computer system.

A first exemplary embodiment will be described. FIG. 1 is a block configuration diagram illustrating a system using a general computer (information processing apparatus) according to an exemplary embodiment of the present disclosure. A central processing unit (CPU) 101 controls an overall computer (client computer) 100 with programs stored in a read only memory (ROM) 1021 and a random access memory (RAM) 1022 of a main storage device 102 or an auxiliary storage device 105. The RAM 1022 is used also as a work area where the CPU 101 executes each processing. The auxiliary storage device 105 stores various programs of an application (app) 1051, a device application (device app) 1052, a general-purpose printer driver 1053, and an operating system (OS) 1054. An input device, such as a keyboard 1031 and a pointing device 1032 represented by a mouse, a touch panel, and a touch pad, is connected to the computer 100 via an input interface (I/F) 103. The apparatus accepts operations for the programs from a user through the input device. An output I/F 104 is connected with an output device such as a monitor 1041, and displays user interface (UI) on the monitor based on instructions of the programs. Note that the pointing device 1032 and the monitor 1041 are integrally formed in some terminals such as a smartphone and a tablet terminal, but respective roles are separately illustrated herein for convenience. The present exemplary embodiment is also applicable to such configuration in which the pointing device 1032 and the monitor 1041 are integrally formed. A communication I/F 106 is connected to a network 1061 to allow communication with an external device of the computer 100 such a computer 1001, a computer 1002, and a printer (image forming apparatus) 202 in FIG. 2. The above-described modules are connected by a system bus 107, and thus data can be exchanged between the modules. Further, the applications 1051 to 1054 including the processing of the present disclosure can be added to the auxiliary storage device 105 via a compact disk (CD)-ROM or a universal serial bus (USB) memory, not illustrated. Further, the applications can be added to the auxiliary storage device 105 via the network 1061. Note that unless otherwise noted, the present disclosure can be applied to any apparatuses regardless of configurations of the apparatuses as long as the functions of the present disclosure are achieved. The present disclosure can be applied to a single apparatus, a system including a plurality of apparatuses, or a system where the connection is achieved via a local network and processing is executed.

Figure 2:
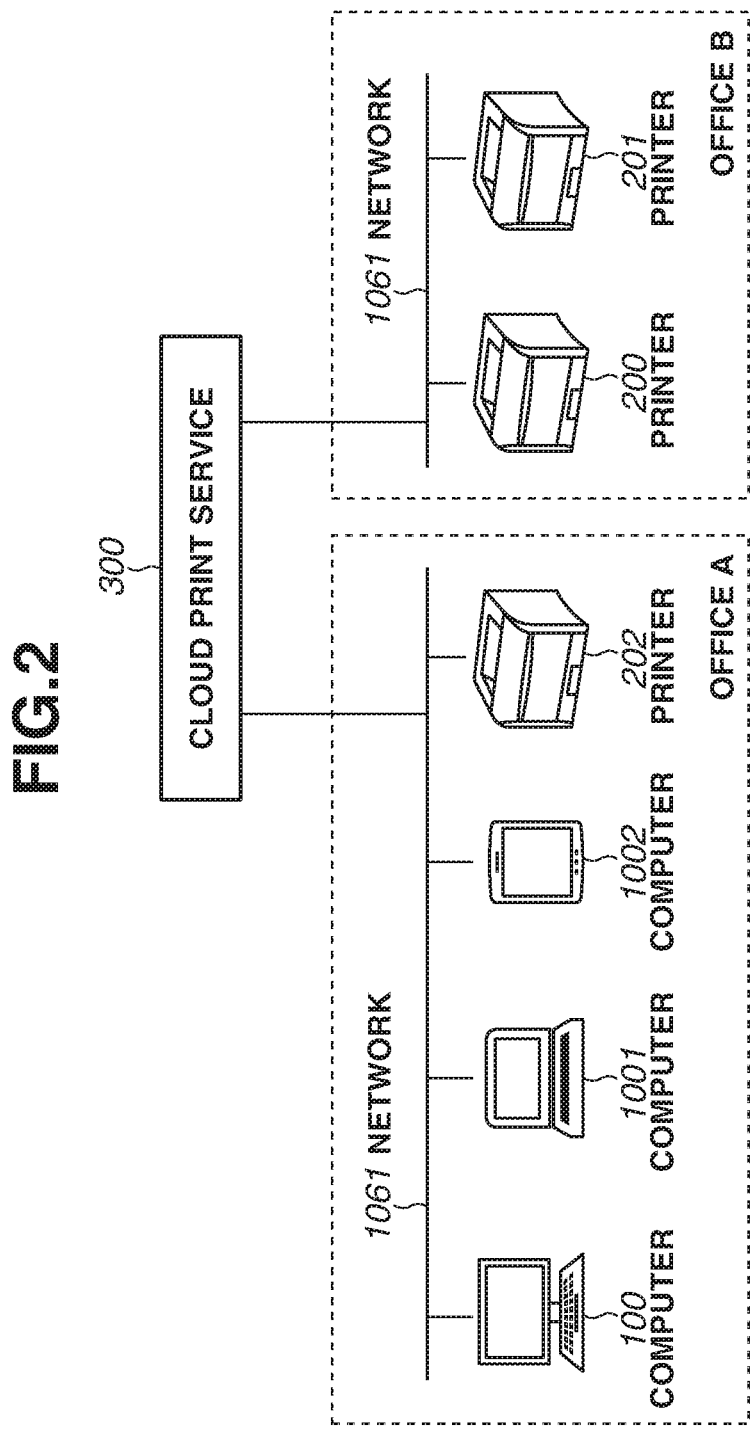
FIG. 2 is a configuration diagram illustrating a communication environment where a client and a printer are connected.

FIG. 2 is a diagram illustrating a simplified environment of the network 1061 according to the present exemplary embodiment. One of or a plurality of computers 100, 1001, and 1002 that generate documents and images to be printed are connected with a network. Further, the printer 202 or the plurality of printers 202 is connected with the network or with the computers 100, 1001, and 1002 via the USBs. In addition, the computer 100 is connected to the cloud print service 300 on the network to be capable of communicating also with printers 200 and 201 which are under control of another network via the cloud print service 300. The network includes small-scale to large-scale networks such as a personal area network (PAN) and a local area network (LAN). All the above-described devices are connected to the networks. Note that a server and a printer may be connected with a cloud via the Internet. A communication method at this time is not limited. For example, a wireless LAN communication method according to the standards 802.11 of the Institute of Electrical and Electronic Engineers (IEEE) or a Bluetooth® communication method may be employed. Alternatively, a cell phone line according to the standards of International Mobile Telecommunication 2000 (IMT-2000) may be employed. Further, as for the USB, besides direct connection, a USB hub or an exchanging system may be used for relay.

Figure 3:
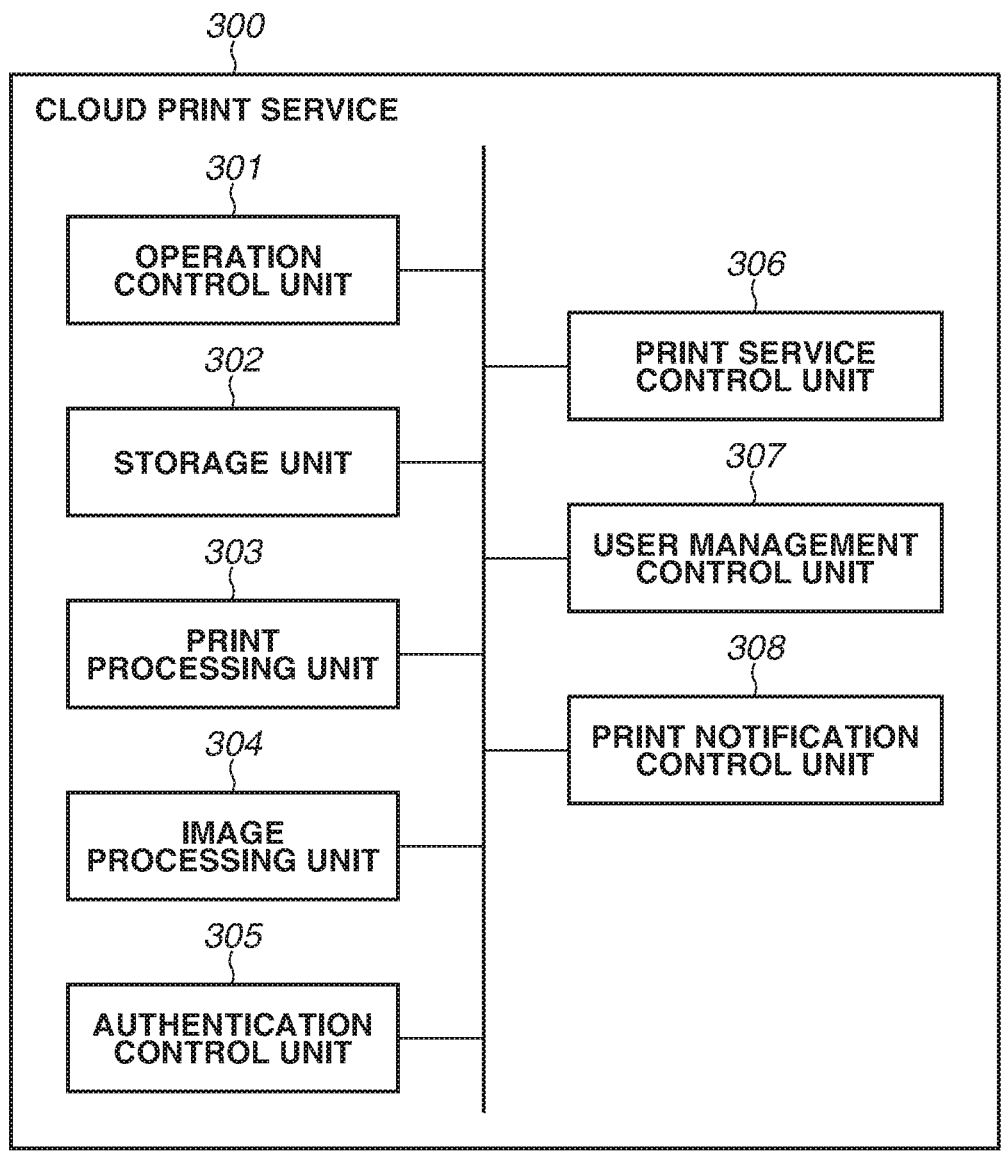
FIG. 3 is a configuration diagram illustrating a cloud print service.

FIG. 3 is a configuration diagram illustrating the server system which is a cloud print service 300 on the network. The cloud print service 300 on the Internet is structured on a plurality of server systems. In the present exemplary embodiment, the cloud print service 300 can be connected with intranets, and is connected with the computer 100 and the printer 200 via the Internet. In the cloud print service 300, accounts are managed using IDs (user identification information) and passwords. Users can access the cloud print service 300 using the accounts. Further, the managed user accounts may be associated with login users of the OS 1054. In a case where the application 1051 performs login authentication and holds an authentication token during the login, the IDs and the passwords do not have to be input.

FIG. 3 is a configurational diagram of the cloud print service 300. The cloud print service 300, which exists on the cloud via the Internet, can provide functions relating to print. In the present exemplary embodiment, the cloud print service 300 includes an operation control unit 301, a storage unit 302, a print processing unit 303, an image processing unit 304, an authentication control unit 305, a print service control unit 306, a user management control unit 307, and a print notification control unit 308. Further, these functions may be other cloud print services in cooperation with the cloud print service 300. The following will describe the printer 200 as an example, but the above functions can be achieved by similar processing in the printers 201 and 202 connectable with the cloud print service 300.

Herein, the operation control unit 301 displays an operation screen directly accessible to a cloud environment, or an operation menu via an application associated with a web browser or the cloud print service 300. The operation control unit 301 then waits for input of an instruction from a user, and transmits instruction contents to another control unit.

The storage unit 302 stores specified data in a storage area managed on the cloud or reads out stored data based on the instruction from another control unit. The data to be managed by the storage unit 302 includes print data such as a print job, user account information, and authentication information used for logging in to the cloud print service 300.

The print processing unit 303 validates print settings of a print job or converts contents data to be printed into a format interpretable by respective environments or the printer to transmit the data.

The image processing unit 304 executes rendering processing on image data and intermediate data for printing of the print job.

The authentication control unit 305 performs authentication using IDs and passwords, login control using a cookie on a browser, and authentication using an authentication token on an application. Furthermore, any method can be used as long as a login session such as single sign-on can be shared.

The print service control unit 306 interprets a print request received from the computer 100, stores a print job as well as management data including a time at which a user from whom the print job has been received. The print service control unit 306 then transmits the print job to the printer 200, and receives a notification at that time.

The user management control unit 307 handles information for managing users. For example, in the present exemplary embodiment, as illustrated in FIG. 4, the user management control unit 307 handles information about a name of a currently authenticated user and a connected device. The user name herein means the ID of a user who has performed login authentication. Note that in a case of a guest account, a temporarily allocated ID, a shared ID, or "unknown" that is allocated by default processing may be handled. A password is described as a pass phrase for user authentication. Alternatively, pattern authentication that is performed by tracing the screen with a mouse or a touch operation, image authentication, biometric authentication, data corresponding to authentication token information about a target application, or a link of that data may be used. Group information means information about a company or a department to which the user belongs. Terminal information means information for specifying a terminal to which the user accesses. In the present exemplary embodiment, a media access control (MAC) address of a network card used by a terminal for connection is exemplified. Further, as the terminal information, any type of information may be used as long as the information can uniquely specify the terminal. Examples of the terminal information include a volume serial number of a hard disk, an ID value in a case where it can be acquired from an operating system (OS), and information about a subscriber identification module (SIM) and a terminal serial number in a case of a mobile terminal. In addition, in a case of an integrated optical scanner (IOS), identification information about an Identifier For Vendor (IDFV) and an Advertising Identifier may be used. Information about an access destination means an internet protocol (IP) address in the present exemplary embodiment. However, any type of information, such as a link and a Uniform Resource Identifier (URI), can be used as long as the information enables access to a specific terminal.

The print notification control unit 308 executes processing for making a notification of print. Further, the print notification control unit 308 holds information about a communication device that has permitted the notification. Examples of the information are a user ID, authentication information, hardware ID (HWID) of a printer to perform print, an IP address of a user terminal, and application information.

Figure 5:
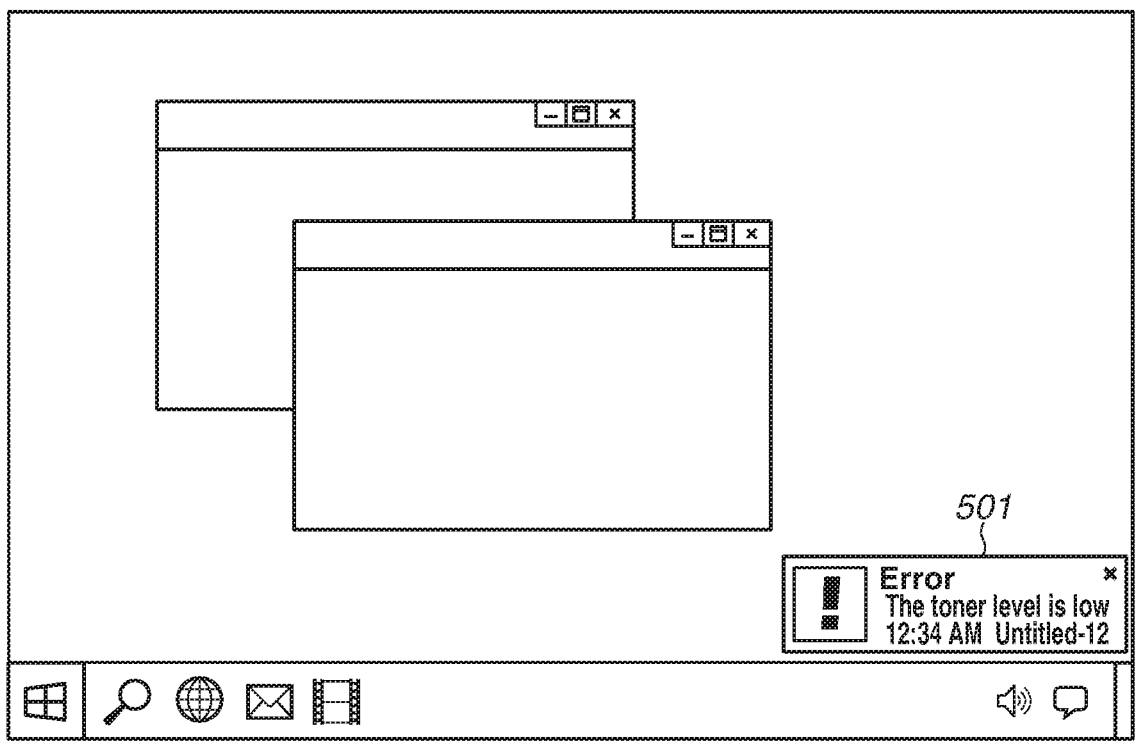
FIG. 5 illustrates a display example of a notification on a computer.

In the present exemplary embodiment, the computer 100 causes the printer 200 to perform print through the cloud print service 300. Further, the computer 100 receives a notification event, such as an error, generated in the printer 200 from the cloud print service 300, and displays a screen notification 501 in FIG. 5.

Figure 6:
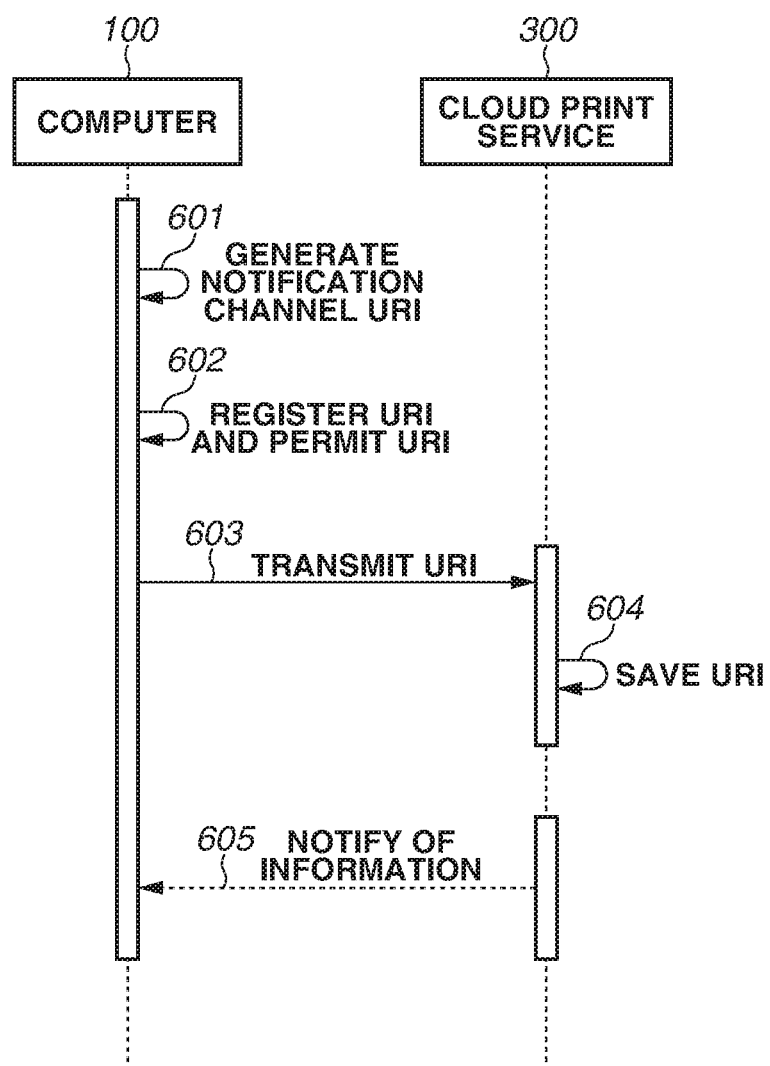
FIG. 6 is a sequence diagram illustrating registration processing relating to a notification between a client and a cloud service.

At this time, when the computer 100 of a client makes the notification, acceptance of communication with the cloud print service 300, which is an unknown connection destination, is not permitted in a default setting for security reason in some cases. Thus, in a registration sequence illustrated in FIG. 6, the computer 100 of the client is registered in the cloud print service 300 to enable accepting the notification of information. Note that in a case where a system that accepts the notification from the cloud print service 300 is originally incorporated into the OS 1054, the sequence is not necessarily executed. Further, in a case where the notification is accepted by using a function of the browser, a method "launch the browser and log in to the browser" may be used as an alternative to waiting for a notification.

First, in step S601, the computer 100 generates a URI of a notification channel. An example of the URI is a URI, which is accessible by the computer 100 of the client, such as "http://user01@ test.pc.com:8080/SampleService".

In step S602, the generated URI is then registered in the computer 100. At this time, an application or a service to be used for the notification is permitted in a case where the notification is desirably permitted. Note that the application or the service may be permitted at any timing in a case where a confirmation is set for a user. In this case, the confirmation "permit notification?" is made if the notification is given.

In step S603, the registered URL is transmitted from the computer 100 to the cloud print service 300. In step S604, the URI is saved and registered also in the cloud print service 300. These operations establish a channel for communication.

Thereafter, in step S605, the computer 100 receives the notification of information from the cloud print service 300 at any timing.

Figure 7:
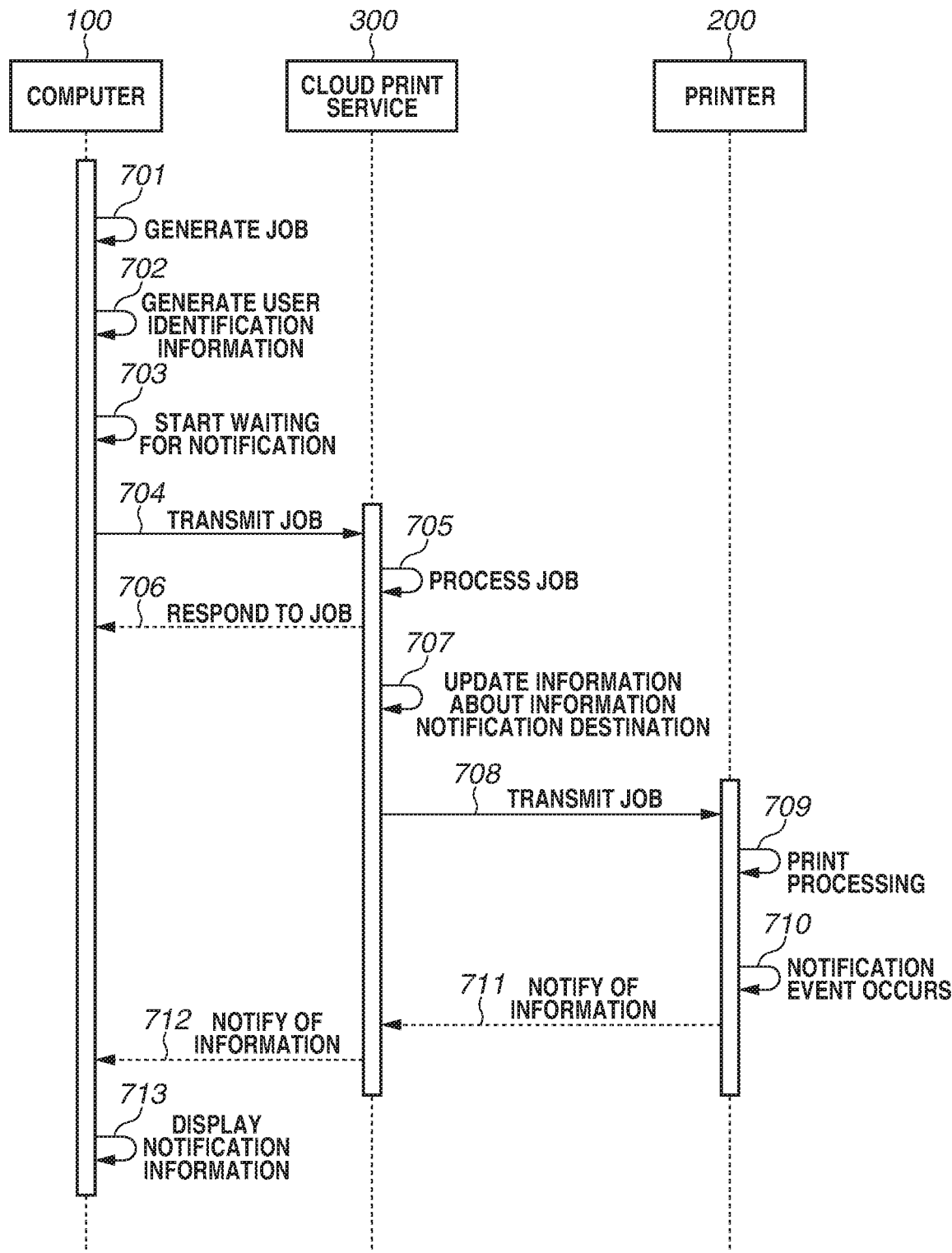
FIG. 7 is a sequence diagram illustrating information notification processing in printing.

FIG. 7 is a sequence diagram illustrating information notification acceptance processing to be executed by the computer 100 at a time of print.

An extended attribute relates to a message notification to be used in the present exemplary embodiment. The "extended attribute (management information)" corresponds to the computer 100 of the client that notifies of messages. The extended attribute has been described with reference to the example of FIG. 4, and thus details of them will be omitted. Parameters of the "extended attribute (notification information)" will be supplemented below. An "information type", which represents a type of information, includes an "error", a "warning", and "information". A "notification message" is text data of contents to be notified. A "notification destination" is information that specifies a notification destination. The notification destination is a "user name" in a case where a user is specified, "group information" in a case where a group is specified, and an "access destination" such as an IP address in a case where a terminal is specified. A "notification range" is for specifying a notification range such as "terminal", "user", "group", and "all terminals". For example, "user" is specified as the "notification range" and "user01" is specified as the "notification destination". In a case of FIG. 4, a message is transmitted to two terminals managed by "user01". In another case, "group" is specified as the "notification range" and "Group001" is specified as the "notification destination". As a result, a notification is transmitted to all terminals under "Group001" that are logged in.

Figure 10:
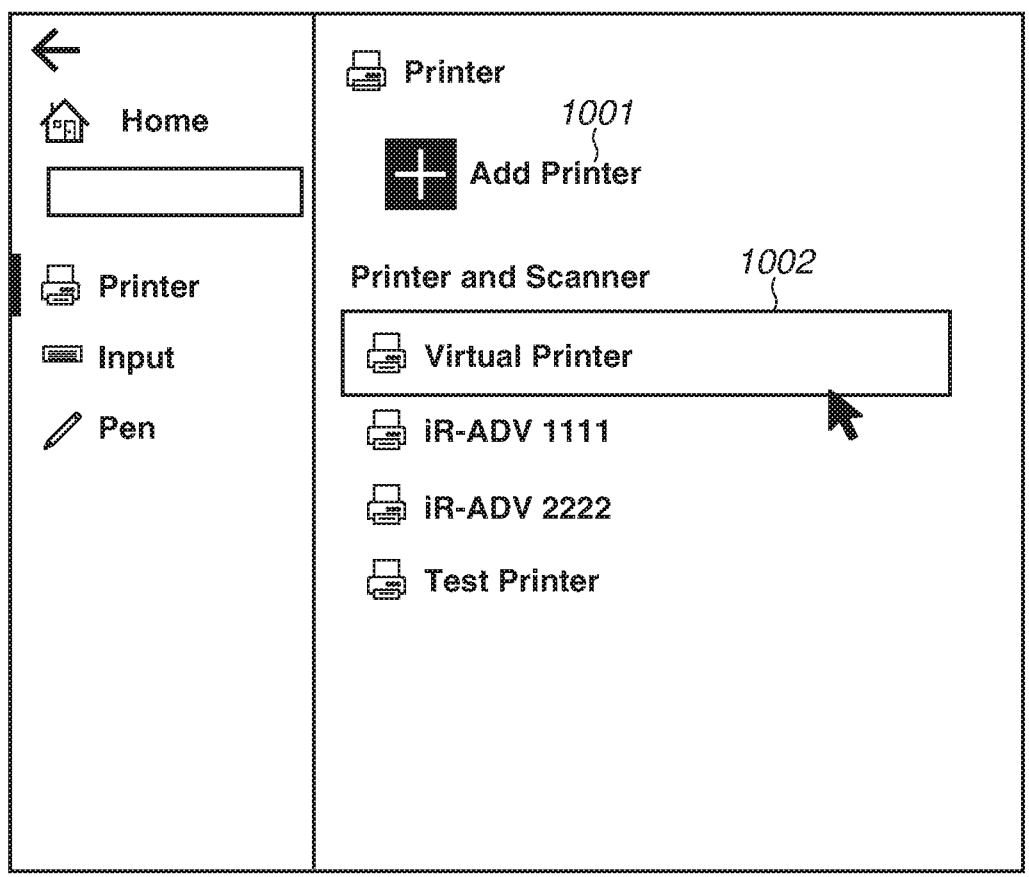
FIG. 10 illustrates a display screen of the installed printer.

First, in step S701, a job is generated for the computer 100 to execute the print processing. Herein, print setting information, such as "both sides" and "color", to be used for printing and print target data are converted into data interpretable by the cloud print service 300, which is a transmission destination, or into intermediate data. A converted result is called a job. At this time, the print destination is specified for a virtual printer of the cloud print service 300. The virtual printer is one of the print functions provided by the cloud print service 300. When a user is logged in to a cloud environment, search and addition of a printer are enabled using an "Add printer" button 1001 in FIG. 10 via a service system such as Active Directory like a normal printer. Further, the virtual printer has information about a "hardware ID (HWID)" which is an ID unique to the printer and a "connection port" of the printer as well as "device name" like the other printers as illustrated in FIG. 11. Note that in the present exemplary embodiment, the IP address is specified as "the connection port" information, but a Web Services on Device (WSD) port such as "WSD-12345678-abcd-efgh-ab1234567890" may be specified. Further, a connection destination address may be an address of the cloud system itself or an address which is virtually allocated. On the OS and the application of the computer, a virtual printer 1002 in FIG. 10 is viewed in an identical form to a normal physical printer, and the print is performed by transmitting a print job just like in the case of the normal printer. In the present exemplary embodiment, the job is transmitted to the printer 200 by executing the print processing in the virtual printer 1002 (namely, by transmitting the job). Alternatively, the print job can be temporarily saved in the cloud print service 300 and the print to be performed at another timing. When printing by this alternative method, a user logs in to the cloud print service 300, which provides the virtual printer of the printer 200, using the browser and causes the cloud print service 300 to display print jobs of the user. The user selects the print job desired to be performed from the displayed print jobs to instruct the print.

In step S702, identification information about the user is generated. This information, which is information such as the group information and the terminal information in FIG. 4 provided to the print job, is to be used in the user management control unit 307 of the cloud print service 300. Herein, the information such as "user name", "password", and "group information" is acquired by inquiring the cloud print service 300 based on the information registered at the time of logging in to the cloud print service 300. Alternatively, such information is generated based on authentication information saved in the system of the computer 100 or a setting information unit of a corresponding application. Further, "terminal information" and "access destination" relate to the computer 100 used for the connection with the cloud print service 300. In the normal cloud print, a print session ends when the print is performed, and thus the cloud print service 300 cannot specify the computer 100 that has performed the print unless a print management screen is called up on a browser. That is, conventionally, the computer 100 cannot acquire information about details of the print processing, such as an occurred error, from the cloud print service 300 after the transmission of the print job. However, the use of this information enables the cloud print service 300 to specify a terminal, such as the computer 100, subject to a notification.

Thereafter, in step S703, the waiting for the notification is started so that the notification can be received from the cloud print service 300. The waiting may be performed by the OS method or service. In another method, the waiting may be performed by processing "launch the browser which has established a login session and bring the browser into standby state" in a case where the notification of information is received by using a function of the browser.

After the job and the user identification information are generated, the computer 100 of the client transmits both together to the cloud print service 300 in step S704.

In step S705, the cloud print service 300, which has received the print job, extracts data of print contents from the received print job, and converts the data into data interpretable by the printer 200 as a print destination. At this time, in step S706, the cloud print service 300 makes a response to a request of the print job. The cloud print service 300, which has received the print job, acquires information for specifying information about a client as a notification destination from attribute parameter information about the print job. Examples of the information to be acquired are "group information", "terminal information" and "access destination" corresponding to "extended attribute (management information)" in FIG. 9. In step S707, the acquired information is associated with job information such as a job ID (job identification information for identifying a job), and is registered in the storage unit 302 of the cloud print service 300. In step S708, the print job is transmitted to the printer 200, and print processing is requested. At this time, the terminal information and the access destination that are the print job transmission destination are switched in the printer 200 to update the ID and the status of the job into the latest ones as need arises. Further, in a case where the print contents have a format that is incompatible with the printer 200, the print contents are converted into a format interpretable by the printer 200.

In step S709, the printer 200, which has received the print processing request, executes the print processing. However, if any notification event occurs in step S710, the printer 200 notifies the cloud print service 300 of information. The notification event that occurs here corresponds to, for example, an error that occurs during printing. If the notification event occurs, the printer 200 acquires the information "extended attribute (notification information)" in FIG. 9, and notifies the cloud print service 300 of the information in step S711. The notification at this time is given as a response to the print request from the cloud print service 300. The cloud print service 300 holds the print job until the print is completed or canceled after the print processing (step S709) is executed. Further, upon reception of the completion notification, the print job on the cloud print service 300 is deleted.

In step S712, the cloud print service 300, which has received the information notification, notifies the computer 100 of the client of the received information. At this time, the notification destination is determined based on the "notification range" information or "notification destination" information (information indicating that "notification is made for user01" because "user" is specified as "notification range" and "user01" is specified as "notification destination") stored by the printer 200. That information is collated with the information in FIG. 4, and thus a device serving as a physical notification destination, such as the computer 100, is specified. If the printer 200 does not support the extended attribute, the cloud print service 300 may execute the following processing according to a predetermined rule. That is, the information "extended attribute (notification information)" may be stored based on error information of the print job or information acquired by executing additional unique communication processing.

In step S713, the computer 100 displays the screen notification 501 based on the latest received information.

The above processing is executed to display notification information at the time of execution of the cloud print service 300.

The notification event that occurs in the printer 200 has been described based on the example of the error at the time of printing. However, in a case where information indicating "the remaining quantity of toner or paper is low", which is desired to be notified to a user, exists even after the normal completion, this information may be the notification event.

A second exemplary embodiment will be described. The first exemplary embodiment has described the notification of the error occurring in the printer 200 at the time of printing in the cloud print service 300. However, notification of information may be desired also on the cloud print service 300. For example, in the first exemplary embodiment, the print instruction was given directly to the printer 200 without changing the print settings of the print job. However, there may be cases where the cloud print service 300 supports print settings for enhanced functionality or have an additional print service. In such a case, the cloud print service 300 having an additional function has additional print settings, and thus the existing print job settings might conflict with the additional print settings. Further, even without the additional function, the cloud print service 300 can validate more detailed print settings than the computer 100 of the client having only default functions in some cases. In such a case, occurrence of an error can be anticipated even before transmitting a print job to the printer 200, and thus the cloud print service 300 makes the notification of error information.

FIG. 12 is a sequence diagram illustrating a notification of an event occurring on the cloud print service 300. Note that a basic flow of job generation is similar to the flow in the sequence of FIG. 7, and thus description thereof is omitted.

If the cloud print service 300, which has received the job transmission in step S705, has an extended function which is not provided by the print job, setting information about that function is added in step S1201. Note that in a case where the user needs to specify additional settings, an application or a web browser is launched, and the settings may be made.

Then, in step S1202, the job setting information is validated/verified. At this time, the cloud print service 300 may communicate with another service or the printer 200 to acquire additional validation data.

If a problem arises as a result of the validation, the computer 100 of the client is notified of the problem in step S1203. In step S1204, the computer 100, which has received the notification, displays the screen notification 501. Note that at this time, a setting screen for correcting a problematic setting may be displayed by clicking on the screen notification 501.

The execution of the above processing enables the notification of an error detected on the cloud print service 300.

A third exemplary embodiment will be described. In the first and second exemplary embodiments, basically a message relating to "error" or "warning" generated on the printer 200 or the cloud print service 300 has been notified. However, it is occasionally appropriate that the notification of a job processing status indicating "job is in progress in the printer 200" is displayed even in a case where any problem has occurred in the cloud print service 300. Particularly in the cloud print service 300, the print job is not directly transmitted from the computer 100 to the printer 200. Thus, in some cases, a complicated structure in which the cloud print service 300 and some related services intervene between the computer 100 and the printer 200 may be employed. Depending on service forms, there may arise a problem that a place of a job is unknown. Thus, it is significant that the notification of the job status is received.

For this reason, the present exemplary embodiment will describe processing for giving a notification to the computer 100 in a case where a job processing status is changed such as when the cloud print service 300 receives a job and when a job is transmitted to the printer.

Further, in the first and second exemplary embodiments, the print processing is executed by directly specifying the printer 200 at the time of print. On the other hand, in the present exemplary embodiment, after the job is received, the processing does not directly proceed to the processing for transmitting the print job in step S708 of FIG. 7, and the job is temporarily held. In this case, the held job is triggered to be transmitted to the printer 200 by reception of an instruction from a user.

Note that also in a case where the job is not held in the cloud print service 300 like the first exemplary embodiment, the job processing status can be notified.

As for the configuration of the cloud print service 300, a configuration where the printer 200 is directly connected to the cloud print service 300 will be described as an example in the present exemplary embodiment. However, instead of the direct connection, another system may intervene between the printer 200 and the cloud print service 300.

Examples of another system include a print server and an external cloud print service that manage the printer 200. In this case, upon reception of the notification issued by the printer 200, the notification is transferred to the cloud print service 300. In this transfer, obviously, the notification information may be updated by conversion or unique information may be added thereto on the external cloud print service.

The notification processing will be described below. The cloud print service 300 gives the notification to the computer 100. The cloud print service 300 makes the notification at a timing of "predetermined time interval" or when "the job is received", "the job is transmitted", or "a job lifetime approaches". Details of the timing will be described below.

In a case where the notification is determined, the notification information is transmitted to the computer 100. Then, a message indicating "the print job 'untitled document.txt' is in progress on 'the cloud print service 300'" is displayed as the screen notification 501 on the computer 100. Note that in a case where a target model name is determined, a thumbnail of the model may be displayed on an area where an icon image of the screen notification 501 is displayed.

Further, processing for calling up a management application of the cloud print service 300 or a web page accessible to the management screen by clicking on the screen notification 501 may be registered. Furthermore, the display may be switched in a manner that the screen notification 501 is widened and more detailed information is displayed by placing the mouse on the screen notification 501. The detailed information refers to information about a target printer, such as a model name, a location of the printer, an IP address, a comment registered in the printer, a shared name, and device capability such as represented by "monochrome device", and bibliographic information about the job such as print settings and a number of pages.

Details of the above-described notification timing will be described below.

First, at the timing when "the job is received", a notification indicating "the job is in progress on the cloud print service 300" is returned every time when the job transmission is received from the computer 100. At this time, if another job is held, a notification of this job may be given.

The timing when "the job is transmitted" is a timing when a user executes the print job on the management screen of the cloud print service 300, the user performs an operation on a panel of the printer 200, or a printer system accepts the job. In this case, an associated notification indicating "the job has been transmitted to the printer 200" is given.

As for the timing of "predetermined time interval", in a case where the job is not executed after the job is introduced into the cloud print service 300, a notification indicating "does the print exist?" is given to the user. That is, a check is made whether a job is held in the cloud print service 300 at a predetermined timing. If a job is held, a notification indicating "the print job is in progress on the cloud service" is given. Note that if a plurality of jobs to be notified exists, all the print jobs may be displayed in a list, or a notification of each job may be given.

Lastly, at the timing when "job lifetime approaches", the job check processing is executed at predetermined time intervals on the cloud print service 300, particularly in a case where a job is set to be deleted at a certain time. In the job existence check, when a job deletion time further approaches, a notification, which is different from a normal one, indicating "the print job 'untitled document.txt' on 'the cloud print service 300' is deleted within . . . " is given.

The execution of the above processing makes it possible to make the notification of the job processing status on the cloud print service 300.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-088593, filed May 8, 2019, and No. 2020-014208, filed Jan. 30, 2020, which are hereby incorporated by reference herein in their entirety.

What is claimed is:

1. A server system comprising:
   a first reception unit configured to receive a print job from an information processing apparatus;
   a holding unit configured to hold job identification information identifying the print job in association with user identification information indicating a user who is logged into the information processing apparatus;
   a transmission unit configured to transmit the print job to an image forming apparatus;
   a second reception unit configured to receive a notification indicating a failure to execute the transmitted print job from the image forming apparatus;
   a specifying unit configured to specify the user identification information associated with the job identification information included in the received notification; and
   a notification unit configured to notify the information processing apparatus, to which the user identified by the user identification information is logged in, of the failure to execute the transmitted print job.

2. The server system according to claim 1, wherein the notification is transmitted also to an apparatus different from the information processing apparatus if the apparatus is logged into by the user identified by the user identification information specified by the specifying unit.

3. The server system according to claim 1, further comprising a deleting unit configured to delete the print job identified by job identification information included in a second notification in a case where the first reception unit receives the second notification indicating that the transmitted print job has been successfully executed.

4. The server system according to claim 1, wherein the specifying unit is configured to specify the user identification information in response to receiving the notification from the image forming apparatus.

5. The server system according to claim 4, wherein the notification unit is configured to notify the information processing apparatus of the failure in response to specifying the user identification information.

6. The server system according to claim 1, wherein the holding unit is configured to hold the print job until the second reception unit receives a notification indicating a success to execute the print job and delete the print job based on receiving the notification indicating the success.

7. The server system according to claim 1, wherein the print job includes the job identification information, and the notification indicating the failure includes the job identification information.

8. A server system control method comprising:
receiving a print job from an information processing apparatus;
holding job identification information identifying the print job in association with user identification information indicating a user who has logged into the information processing apparatus;
transmitting the print job to an image forming apparatus;
receiving a notification indicating a failure to execute the transmitted print job, from the image forming apparatus;
specify the user identification information associated with the job identification information included in the received notification; and
notifying the information processing apparatus, to which the user identified by the user identification information is logged in, of the failure to execute the transmitted print job.

9. The server system control method according to claim 8, wherein the notification is also transmitted to an apparatus different from the information processing apparatus if the apparatus is logged into by the user identified by the user identification information specified in the specifying.

10. The server system control method according to claim 8, further comprising deleting the print job identified by job identification information included in a second notification in a case where the second notification indicating that the transmitted print job has been successfully executed is received.

11. An image forming apparatus comprising:
a reception unit configured to receive a print job from a server system that (a) has received the print job from an information processing apparatus and (b) has held job identification information identifying the print job in association with user identification information indicating a user who is logged into the information processing apparatus;
a processing unit configured to process the print job;
a transmission unit configured to transmit a notification indicating a failure to execute the print job to the server system that (c) is to specify the user identification information associated with the job identification information included in the notification, and (d) is to notify the information processing apparatus, to which the user identified by the user identification information is logged in, of the failure to execute the print job.

12. The image forming apparatus according to claim 11, wherein the server system specifies the user identification information in response to receiving the notification transmitted from the transmission unit.

13. The image forming apparatus according to claim 11, wherein the transmission unit transmits the notification to notify the information processing apparatus of the failure in response to the server system specifying the user identification information.

14. The image forming apparatus according to claim 11, wherein the transmission unit transmits a notification indicating a success to execute the print job and delete the print job, and wherein the server system holds the print job until the notification indicating the success is received by the server system.

15. The image forming apparatus according to claim 11, wherein the print job includes the job identification information, and the notification indicating the failure includes the job identification information.

* * * * *